US011722543B2

(12) United States Patent
Newton et al.

(10) Patent No.: US 11,722,543 B2
(45) Date of Patent: *Aug. 8, 2023

(54) INTEGRATED SYSTEM AND METHOD FOR EXECUTING A COMMUNAL MEDIA SESSION ACROSS MULTIPLE PLATFORMS

(71) Applicant: Groopview, Inc, Philadelphia, PA (US)

(72) Inventors: Delmond Newton, Philadelphia, PA (US); Krishnan Rajam, Germantown, MD (US)

(73) Assignee: Groopview, Inc., Philadelphia, PA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/533,474

(22) Filed: Nov. 23, 2021

(65) Prior Publication Data
US 2022/0159052 A1 May 19, 2022

Related U.S. Application Data

(63) Continuation-in-part of application No. 17/221,886, filed on Apr. 5, 2021, now Pat. No. 11,558,441, (Continued)

(51) Int. Cl.
H04L 65/60 (2022.01)
G06Q 50/00 (2012.01)
(Continued)

(52) U.S. Cl.
CPC ........... *H04L 65/762* (2022.05); *G06Q 50/01* (2013.01); *H04L 9/3226* (2013.01);
(Continued)

(58) Field of Classification Search
CPC ... H04L 65/1073; H04L 65/403; H04L 65/60; H04L 65/601; H04L 65/602;
(Continued)

(56) References Cited

U.S. PATENT DOCUMENTS 9,282,068 B1* 3/2016 Pan .................. H04L 65/403
2010/0274858 A1* 10/2010 Lindberg ................ G06F 9/452
715/838
2015/0134737 A1* 5/2015 Albrecht .................. H04L 51/52
709/204

* cited by examiner

*Primary Examiner* — Kostas J Katsikis
(74) *Attorney, Agent, or Firm* — Neal Blibo, LLC; Arlene P. Neal

(57) ABSTRACT

A method for delivering multimedia content during a communal session at a media system commutatively coupled with a streaming application. The method includes receiving a request to initiate the communal session; retrieving contact information for user devices selected to participate in the communal session; retrieving an address for each of the user devices; receiving a source location for multimedia content selected in the streaming application; and sharing the source location with a player that is configured to transmit the multimedia content to each of the user devices. The method also includes, at an appointed time, initiating video playback for each of the user devices, synchronizing delivery of the multimedia content and social media content generated on each of the user devices, and exchanging playback control messages with the streaming application to direct the synchronized transmissions of the multimedia content and social media content to each of the user devices.

18 Claims, 11 Drawing Sheets

Related U.S. Application Data which is a continuation of application No. 16/951,404, filed on Nov. 18, 2020, now Pat. No. 11,388,215.

(51) Int. Cl.
*H04L 65/4053* (2022.01)
*H04L 65/611* (2022.01)
*H04L 65/75* (2022.01)
*H04L 9/32* (2006.01)

(52) U.S. Cl.
CPC ........ *H04L 9/3297* (2013.01); *H04L 65/4053* (2013.01); *H04L 65/611* (2022.05)

(58) Field of Classification Search
CPC ............... H04L 65/605; H04L 65/4015; H04L 65/4053; H04L 65/4076; H04L 65/4084; H04L 65/80; H04L 67/1095; H04L 67/325; H04L 9/3226; H04L 9/3297; H04L 2463/101; G06Q 50/01; G06Q 20/1235; G06Q 30/0277; G06Q 2220/18; G06F 21/10; G06F 2221/0713; G06F 16/489; H04W 12/033; H04N 21/4307; H04N 21/43076

See application file for complete search history.

```
        (A)
         ↓
```

680 — IF CREDENTIALS PROVIDED BY A USER DEVICE WERE NOT AUTHENTICATED, AUTHENTICATION SYSTEM 102E INITIATES A PROCESS WHEREBY THE UNAUTHENTICATED USER DEVICE MAY PURCHASE ACCESS TO THE CONTENT

690 — IF CREDENTIALS PROVIDED BY A USER DEVICE WERE AUTHENTICATED AND ENTITLEMENT TO THE SELECTED CONTENT IS CONFIRMED, AUTHENTICATION SYSTEM 102E ALLOWS THE AUTHENTICATED USER DEVICE TO ACCESS THE CONTENT ( END )

FIG. 6 CONTINUED

INTEGRATED SYSTEM AND METHOD FOR EXECUTING A COMMUNAL MEDIA SESSION ACROSS MULTIPLE PLATFORMS

CROSS REFERENCE TO RELATED APPLICATION

The present application is a continuation-in-part of U.S. application Ser. No. 17/221,886 titled "An Integrated System and Method for Executing a Communal Media System in a Streaming Application," filed Apr. 5, 2021, which is a continuation-in-part of U.S. application Ser. No. 16/951,404 titled "A Multilayer and Synchronized Communal Social Media System and Method," filed Nov. 18, 2020, which claims the benefit of U.S. Provisional Application Ser. No. 16/872,704 titled "A Communal Social Media System and Method," filed May 12, 2020, which claims the benefit of U.S. Provisional Application Ser. No. 62/925,212 titled "Method For Viewing Online Content," filed Mar. 23, 2019, which claims the benefit of U.S. Provisional Application Ser. No. 62/749,298 titled "Method For Viewing Online Content," filed Oct. 23, 2018, all of which are incorporated by reference herein in their entirety.

BACKGROUND OF THE INVENTION

Individuals in different locations may watch the same video or other multimedia content using a streaming application, such as Netflix. The streaming application may be integrated with a video sharing application, for example, a Chrome tele-party extension, so that two or more individuals may stream and watch a video together in the streaming application during a communal session. However, these communal sessions are typically not fully synchronized due to the differences in the network configurations of the devices used to stream the multimedia content. For example, when multiple individuals are simultaneously streaming a video, there are likely to be different lag times on when the video is received on each user's device due to the differences in the configuration of each user's device/network, for example, the bandwidth associated with each user's network.

Moreover, participants in a streaming session may sign up for the same subscription service through different service providers or platforms. For example, participants in a streaming session may access subscription content (from, for example, HBO or Showtime) through service providers such as Verizon, AT&T, or Comcast. In current systems, a participant in a streaming session may access the subscription content (for example, HBO content) either via a direct subscription with the subscription content provider (in this case HBO) or via a subscription with a service provider or service platform (for example, Verizon, AT&T or Comcast) which includes access to the subscription content.

There is currently no system for authenticating access to subscription content, via different service platforms, during a communal session. For example, there is currently no system for authenticating that one participant in a communal session has access to HBO via Verizon and another participant has access to HBO via Comcast. Without being able to authenticate participants' access to the same subscription content via different service platforms, current systems cannot allow communal viewing of subscription content when the participants are granted access to the subscription content via different service platforms. There is thus a need for an improved system and method of authenticating access to subscription content during a communal session for individuals on different platforms, for allowing a streaming application to fully synchronize the subscription content being viewed on multiple devices during the streaming session, and for synchronizing the subscription content with social media content being transmitted across devices during the streaming session.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
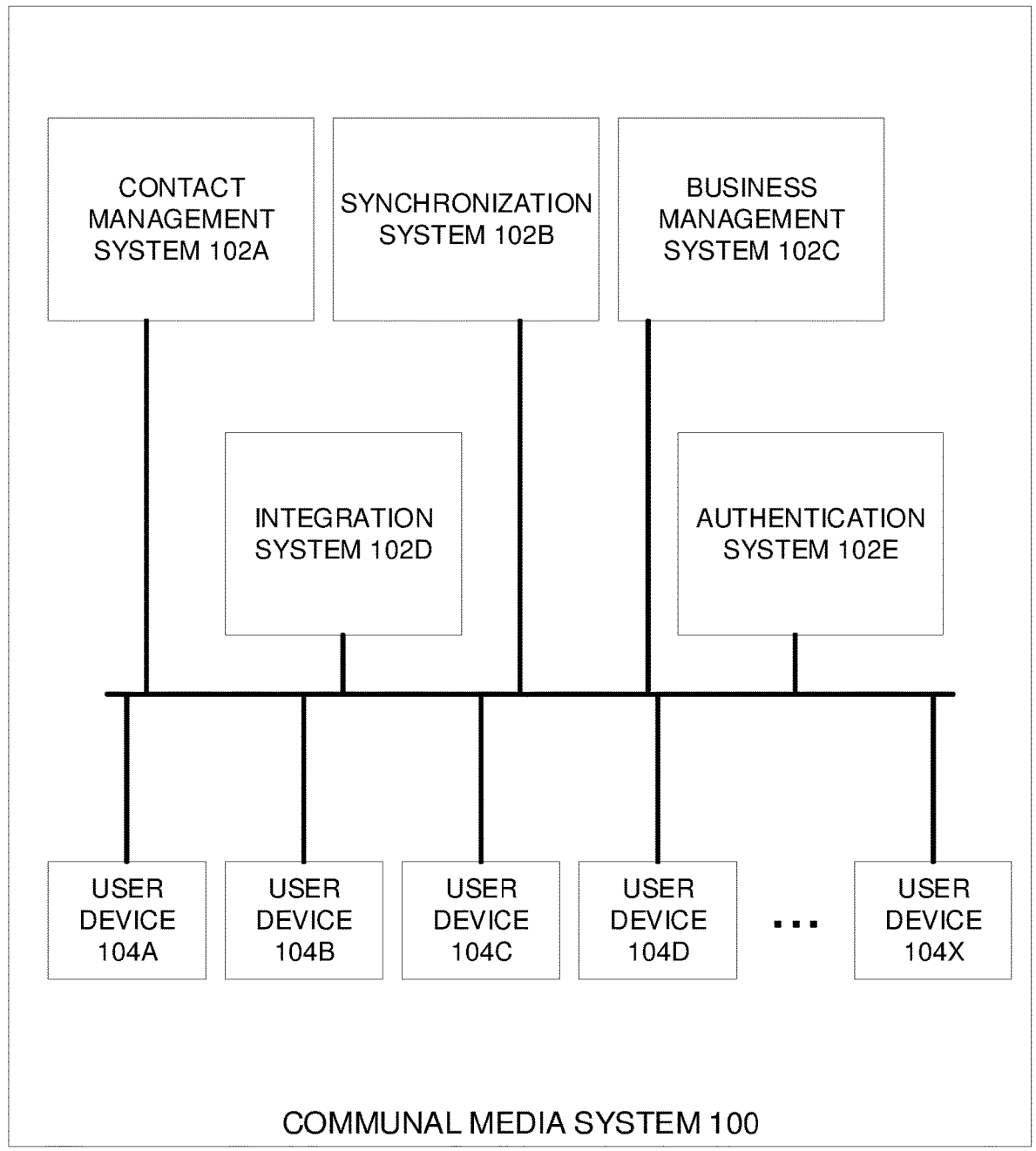
FIG. 1 is a block diagram of a communal media system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 is a block diagram of a communal media system used in accordance with some embodiments. Communal media system 100 is configured to integrate with a streaming application 402 (shown in further details in FIG. 4) to synchronize multimedia content being transmitted from streaming application 402 and simultaneously viewed on multiple devices during a communal session. Examples of streaming applications 402 may be, for example, HBO, Netflix, Hulu, Showtime, Verizon Fios, or other streaming applications including multimedia content that can be streamed to user devices. The multimedia content may be live or recorded multimedia content. Communal media system 100 is configured to synchronize delivery of the multimedia content transmitted from streaming application 402 with social media content generated on the devices during the communal session.

Communal media system 100 is configured to include one or more systems 102 (shown as, for example, a contact management system 102a, a synchronization system 102b, a business management system 102c, an integration system 102d, and an authentication system 102e), each of which may be in the same physical location as components on a single computing device or on different computing devices that are communicatively coupled. Systems 102 may also be in remote locations on different computing devices that are communicatively coupled. Systems 102 may include additional components (not shown for the sake of simplicity) that may be used to transmit information across communal media system 100.

Contact management system 102a is configured to manage invitations and notifications to user devices participating in a communal session. Synchronization system 102b is configured to synchronize delivery of information to user devices executing streaming application 402 during a communal session, such that each of the user devices in the communal session can receive the same information at the same time. Business management system 102c is configured to analyze operations on communal system 100. Integration system 102d is configured to integrate and communicatively couple communal media system 100 with streaming application 402, such that messages generated on communal media system 100 can be transmitted to streaming application 402, and vice versa. When communal media system 100 is integrated with a streaming application, communal media system 100 may be executed within streaming application 402 and may operate as a component of streaming application 402. Authentication system 102e is configured to authenticate access to subscription content for users participating in a communal session across one or more service platforms. For example, authentication system 102e may authenticate access to the subscription content for users participating in a communal session even if access for participants in the communal session is provided through two or more service platforms.

Streaming application 402 is configured to communicate with multiple user devices 104 (shown as, for example, user devices 104a-104x) that are communicatively coupled to each other and with streaming application 402 and communal media system 100. User devices 104 may be stationary devices such as desktops, personal computers, or gaming devices; mobile devices such as mobile phones or tablets; or other computing devices that can be used for viewing multimedia content and interacting with social media applications. Each user device 104 may be independently configured. For example, user device 104a may be configured to operate on the iOS platform and on a 5G network having a first set of specifications, user device 104b may be configured to operate on the Android platform on a 5G network having a second set of specifications, user device 104c may be configured to operate on the iOS platform and on a 4G network having a first set of specifications, and user device 104d may be configured to operate on the iOS platform and on a 4G network having a third set of specifications, where the first, second and third specifications may be different. Despite the differences in the configurations of user devices 104, communal media system 100 is configured to synchronize simultaneous delivery of multimedia content transmitted from streaming application 402 and other social media content generated on user devices 104, such that each user device 104 receives the multimedia and social media content at the same time during a communal session.

At an initial period, each user device 104a-104x is configured to download and install streaming application 402 from, for example, a mobile app store or the Internet. After installing streaming application 402 on each user device 104, a user device (for example, device 104a) may register with and log-in, by entering authentication/subscription credentials, into streaming application 402 to stream multimedia content from streaming application 402. User device 104a may then select content from streaming application 402. In some embodiments, the content selected by user device 104a may require a subscription and user device 104a may have access to the subscription content based on subscription credentials entered into streaming application 402. For example, if the streaming application is an HBO application, the user device 104a may access HBO subscription content based on subscription credentials used to enter the HBO application. In this case, when the user device 104a signs in with streaming application 402, the user device 104a may be granted access to the selected subscription content.

If the content selected by the user of device 104a is subscription content that is accessible to the user based on a subscription with an external service provider, the user device 104a may be prompted to select or otherwise provide the name or other information of the external service provider with whom user of device 104a has a subscription for the selected content. User device 104a may also be prompted to provide authentication credentials for accessing the selected content through the external service provider. For example, if device 104a is using Netflix as the streaming application 402 and user device 104a selects subscription content from HBO and if streaming application 402 determines that user device 104a does not have access to HBO through its Netflix subscription, user device 104a may be prompted to select an external service provider through which user device 104a has access to HBO. For example, user device 104 may select Comcast as the external service provider through which user device 104a has access to HBO and may provide its authentication credentials for Comcast.

Authentication system 102e may authenticate the user device 104a by transmitting the authentication credentials transmitted from user device 104a to an external authentication server, wherein the external authentication server may authenticate and validate entitlements for user device 104a. For example, external authentication server may authenticate that the user of device 104a is a subscriber of the selected service provider and validate that the user of device 104a is entitled to access to the selected subscription content based on the subscription information provided by device 104a. Alternatively, authentication system 102e may authenticate and validate entitlements for user device 104a directly with the selected service provider. Authentication system 102e may obtain confirmation of the authentication and entitlements from the service provider or the external authentication server. If authentication system 102e is unable to authenticate and validate entitlements of user device 104a, authentication system 102e may provide an option for the user of device 104a to purchase a subscription to the selected content.

The user of device 104a may also elect to participate in a communal session, wherein the selected content is streamed to user device 104a and to other user devices 104b-104x selected by the user of device 104a to participate in the communal session. To initiate a communal session, host device 104a, i.e., the device that initiated the communal session after selecting content from streaming application 402, may select a communal session feature provided in streaming application 402. After selecting the communal session feature, streaming application 402 initiates communal media system 100, wherein in cooperation with streaming application 402, communal media system 100 is configured to execute the communal session.

In the example where host device 104a selects the communal session feature to start a communal session, the user of device 104a may select participants for the communal session. For example, the user of device 104a may select the participants for the communal session by entering identifying information such as an email or phone number for each participant or by selecting the participants from a list provided by streaming application 402. If the user of device 104a selects users of devices 104b-104d as participants of the communal session, the content selected by device 104a may be shared/viewed on devices 104a-104d in a communal setting at an appointed time.

When communal media system 100 is initiated, contact management system 102a, via integration system 102d, may retrieve the contact information associated with devices 104b-104d from streaming application 402. For example, contact management system 102a may retrieve the email or telephone number associated with devices 104b-104d from streaming application 402. Contact management system 102a may thereafter send invitations and notification, through integration system 102d, to devices 104b-104d for the users of devices 104a-104d to participate in the communal session at the appointed time. Integration system 102d may send the invitations directly to user devices 104b-104d or send the invitations via streaming application 402. Each of the users of devices 104b-104d may accept or reject the invitation.

When the communal session is initiated and each of devices 104b-104d accepts the invitation, authentication system 102e may provide a list of service providers to each of devices 104b-104d. Each of devices 104b-104d may be used to select or otherwise enter an external service provider with whom the associated user has a subscription that allows access to the content selected by host device 104a. Each of devices 104b-104d may provide authentication credentials associated with the selected service provider to authentication system 102e. Authentication system 102e may obtain a first validation for users of each of devices 104b-104d by transmitting the authentication credentials transmitted from each device 104b-104d to the external authentication server. The external authentication server uses the authentication credential to authenticate that each device 104b-104d providing the authentication credentials is a subscriber of the service platform selected by device 104b-104d and validates that the users of each device 104b-104d is entitled to access to the subscription content selected by host device 104a. Alternatively, authentication system 102e may obtain the first validation for each of devices 104b-104d by directly authenticating the credentials provided by each device 104b-104d with the service platform selected by user device 104b-104d and by obtaining confirmation from the service provider that the user is entitled to access to the subscription content selected by host device 104a. If authentication system 102e is unable to obtain the first validation for any of user devices 104b-104d, authentication system 102e may provide, to that user device 104b-104d, an option to purchase a subscription to the content selected by host device 104a.

If host device 104a selects a future time as the appointed time for activating the communal session such that the appointed time is later than an initiation period when the communal session was initiated, authentication system 102e may obtain a second validation, for users of each of devices 104a-104d, from the external authentication server or the service platform at the appointed time, wherein the second validation is an indication that each device 104a-104d still has access to view the selected content at the appointed time.

Once authenticated at the appointed time, integration system 102d may obtain an address of each user device 104a-104d running streaming application 402 and participating in the communal session. The address may be an internet protocol (IP) addresses, a device identifier, an email address, a telephone number, or other information that uniquely identifies device 104a-104d.

When necessary, authentication system 102e may provide access to subscriptions to the platform offering the selected content to one or more user devices 104a-104d and is configured to receive payments for the subscription from one or more user devices 104a-104d. For example, if a user of device 104d does not have a subscription for accessing the platform offering the selected content, either directly or through a service provider, authentication system 102e may provide access to a subscription to the user of device 104d and is configured to receive payments for the subscription from the device 104d.

In some embodiments, authentication system 102e may provide access to subscription to the selected content to one or more user devices 104a-104d and is configured to receive payments for access to the selected content from one or more user devices 104a-104d. For example, if a user of device 104b-104d does not have a subscription to access the content, either directly or through a service provider, authentication system 102e may provide access to the content to the user of device 104a-104d and is configured to receive payment for access to the content from the device needing such access.

In some embodiments, authentication system 102e may receive payment from a first device for access to the selected content by a second device. Consider an example where the user of device 104b does not have access to the selected content. Authentication system 102e may receive payment from device 104a, wherein the payment from device 104a is for device 104b to access the selected content.

Once the confirmation from the content owner or distributor for the authentication credential sent from each device 104a-104d is obtained, communal media system 100 may obtain decryption keys for the content from a digital rights management (DRM) system. Communal media system 100 may then present the decrypted information to user devices 104a-104d for communal viewing.

Prior to starting the communal session, synchronization system 102b is configured to capture system configuration information from each user device 104a-104b and determine if the configuration on the user device meets a predetermined threshold. For example, synchronization system 102b may determine if the bandwidth available for each user device 104a-104b is above a predetermined minimum bandwidth threshold. If synchronization system 102b determines that the bandwidth for a user device is below the predetermined minimum bandwidth threshold, synchronization system 102b may determine that the device with bandwidth below the minimum bandwidth threshold cannot be supported and will prevent the device from participating in the communal media session. If synchronization system 102b determines that the bandwidth of a user device 104 is at or above the predetermined threshold, synchronization system 102b may allow the user of that device to participate in the communal media session.

Consider, for example, that synchronization system 102b is configured evaluate the network/device configuration of each user device 104a-104b. Synchronization system 102b may obtain the device configuration, location, network carrier, and/or the network type (for example, WiFi, LTE, 5G) of each user device 104a-104d. Synchronization system 102b may also determine the minimum network bandwidth required for a communal session. For example, if synchronization system 102b determines that user device 104a has a bandwidth of 100 Mbps, user device 104b has a bandwidth of 75 Mbps, user device 104c has a bandwidth of 100 Mbps, and user device 104d has a bandwidth of 25 Mbps, synchronization system 102b may determine that the minimum network bandwidth on user devices 104-104d is 25 Mbps. If synchronization system 102b determines that the minimum required network bandwidth is below 25 Mbps, synchronization system 102b may determine that all of user devices 104-104d meet the network criteria for participating in communal media sessions. Synchronization system 102b may also test the speed of each user device 104a-104d and store the information for each user device 104a-104d along with a timestamp.

At the start of the communal session, integration system 102d is configured to request that each user device 104a-104d activates one or more cameras on the user device. When the cameras on devices 104a-104d are activated, integration system 102d is configured to initiate a video chat session, such that the video chat session is initiated and overlaid on top of the video rendered by the streaming application 402. Integration system 102d is further configured to receive the source location information for the content selected by host device 104a from streaming application 402 and to transmit the source location information to a video player 404 in streaming application 402, wherein video player 404 is configured to transmit the selected content to each user device 104a-104d. The source location information may be encrypted or non-encrypted information. In some embodiments, the source location information may be obtained from host device 104a, wherein the source location is based on subscription content accessed by host device 104a. In other embodiments, the source location information may be obtained based on subscription content accessed from one of device 104b-104d selected by host device 104a.

Synchronization system 102b is configured to initiate, via the video player 404, video playback on each user device 104a-104d and to synchronize the simultaneous delivery of multimedia content transmitted from video player 404 to user devices 104a-104d, such that each user device 104a-104d receives the delivered content at the same time with no noticeable delivery lag, as though each user device is a single device in the same location. Synchronization system 102b is also configured to synchronize the simultaneous delivery, via video player 404, of live videos captured from forward and/or rear cameras on one or more user device 104a-104d. The synchronized delivery is sent to those devices 104a-104d not creating the videos, such that each user device 104a-104d receives the delivered video at the same time it is being recorded with no noticeable delivery lag. Synchronization system 102b is further configured to simultaneously transmit, via video player 404, video chats, texts, emotive responses, and other social media content generated on one of the user devices to other user devices not creating the social media content, wherein the social media content is overlaid on the multimedia content.

Synchronization system 102b may ensure that the multimedia and social media content is synchronized on user devices 104a-104d by exchanging control messages with streaming application 402. As the media is played in devices 104a-104d, video player 404 may continuously send timestamp receipts and frame identifier acknowledgments of media fragment being played on each device 104a-104d to synchronization system 102b, wherein synchronization system 102b uses the timestamp receipts and frame identifier acknowledgments to synchronize delivery of content across devices 104a-104d.

When a communal session concludes, video player 404 transmits a completion message to integrated system 102a. Communal media system 100 then closes the video chat session and transfers control to streaming application 402. Business management system 102c may then obtain and/or analyze data associated with the session.

In an embodiment, a user associated with a device 104a-104d may create a profile photo of the user, record an image of the user, or create an avatar that is configured to represent an image of the user, wherein the avatar may mimic the user's actions, including speaking and other actions performed by the user. The avatar or other images of users associated with devices 104a-104d, video chats, texts, emotive responses, and other social media features generated on devices 104a-104d may be overlaid on the delivered multimedia content during the communal session. This enables the users of devices 104a-104d to view the multimedia content and social media interactions at the same time, without any noticeable lag time associated with receipt of the multimedia and social media content at user devices 104a-104d. Other content such as targeted advertisement and recommendations based on previous usage on one or more user device 104a-104d may also be overlaid on the delivered multimedia content.

In an embodiment, the host device may pause, rewind, or fast forward the multimedia content, wherein synchronization system 102b is also configured to ensure that the pause, rewind, or fast forward action is synchronized across all user devices.

In an embodiment, the host may make the communal session live to the public by activating a live button on the user interface. Once the session is live, users of other devices, for example, devices 104e-104x that are accessing communal media system 100 may view and participate in the session by sending texts, emotive responses, and other social media features generated on those uses devices 104e-104x. The live session may have a ticker counter to identify how may users are participating in the live session.

In some embodiments, a thumbnail image of the selected content may be provided in communal media system 100. Users of devices 104a-104d may manipulate the thumbnail images by, for example, moving, resizing, or deleting the image on the user interface.

Figure 2:
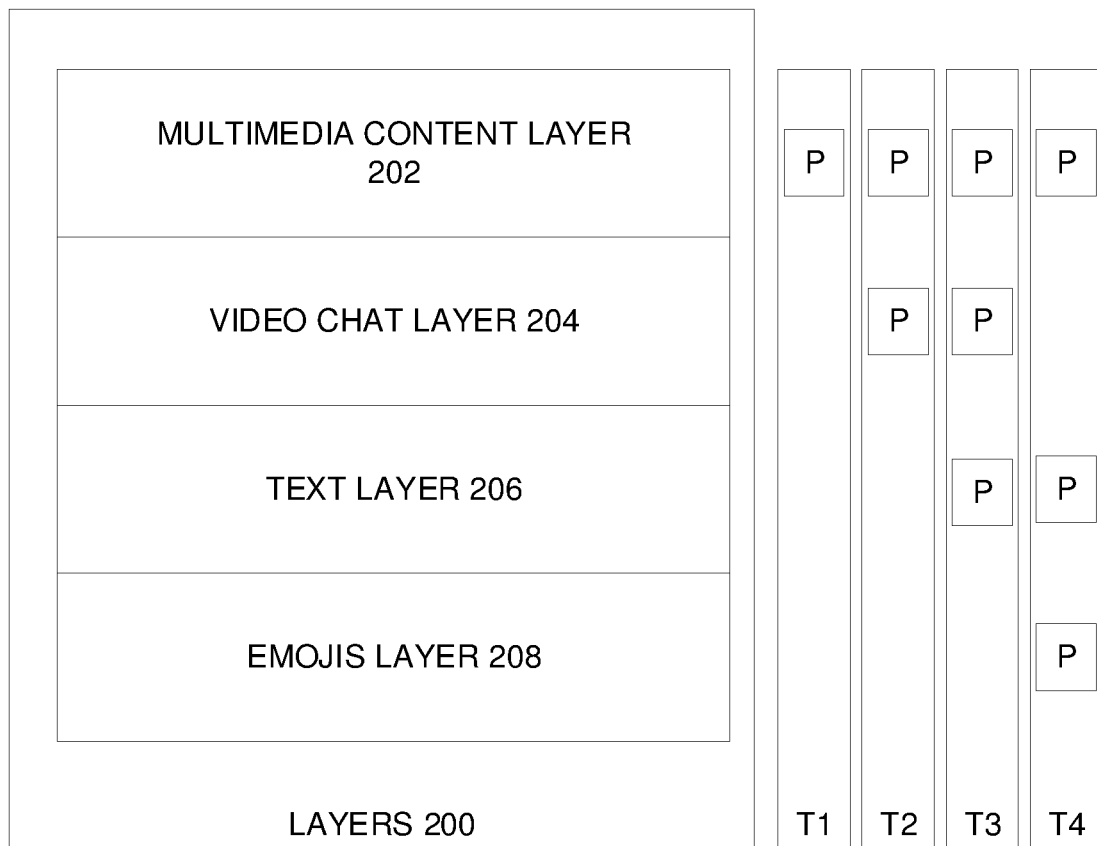
FIG. 2 is a block diagram of how packets are structured and delivered in the communal media system in accordance with some embodiments.

FIG. 2 is a block diagram of how packets are structured and delivered in the communal media system 100 in accordance with some embodiments. Synchronization system 102b is configured to separate content transmitted over communal media system 100 into multiple layers 200 and to synchronize delivery of the multiple layers to user devices 104a-104d, i.e., those user devices registered to participate in the session on communal media system 100. For example, synchronization system 102b may configure the multimedia content selected from streaming application 402 in a multimedia content layer 202, video chats received from user devices 104a-104d in a video chat layer 204, texts received from user devices 104a-104d in a text layer 206, and emojis received from user devices 104a-104d in an emojis layer 204. It should be apparent that synchronization system 102b may separate content transmitted over communal media system 100 into more or fewer layers than layers 202-208.

After separating the content into layers 200, synchronization system 102b may prioritize delivery of packets. For example, packets in multimedia content layer 202 may have a first priority, packets in video chat layer 204 may have a second priority, packets in text layer 206 may have a third priority, and packets in emojis layer 204 may have a fourth priority. Synchronization system 102b is also configured to synchronize voice and video packets in video streams in multimedia content layer 202 and voice and video packets in video chat layer 204 so that there is no lag time between the voice and the video packets in each layer. As such, synchronization system 102b is configured to synchronize delivery of packets in the same layer and delivery of multiple layers of content across disparate devices and disparate access networks so that all user devices 104a-104d may receive content delivered over communal media system 100 at the same time.

Consider, for example, that synchronization system 102b has packets (P) in different layers that are to be delivered at times T1-T4, as shown in FIG. 2. At T1, the packets in multimedia content layer 202 are delivered first. At T2, the packets in multimedia content layer 202 are delivered before the packets in video chat layer 204. At T3, the packets in multimedia content layer 202 are delivered first, the packets in video chat layer 204 are delivered second, and the packets in text layer 206 are delivered last. At T4, the packets in multimedia content layer 202 are delivered first, the packets in text layer 206 are delivered second, and the packets in emoji layer 208 are delivered last.

Figure 3:
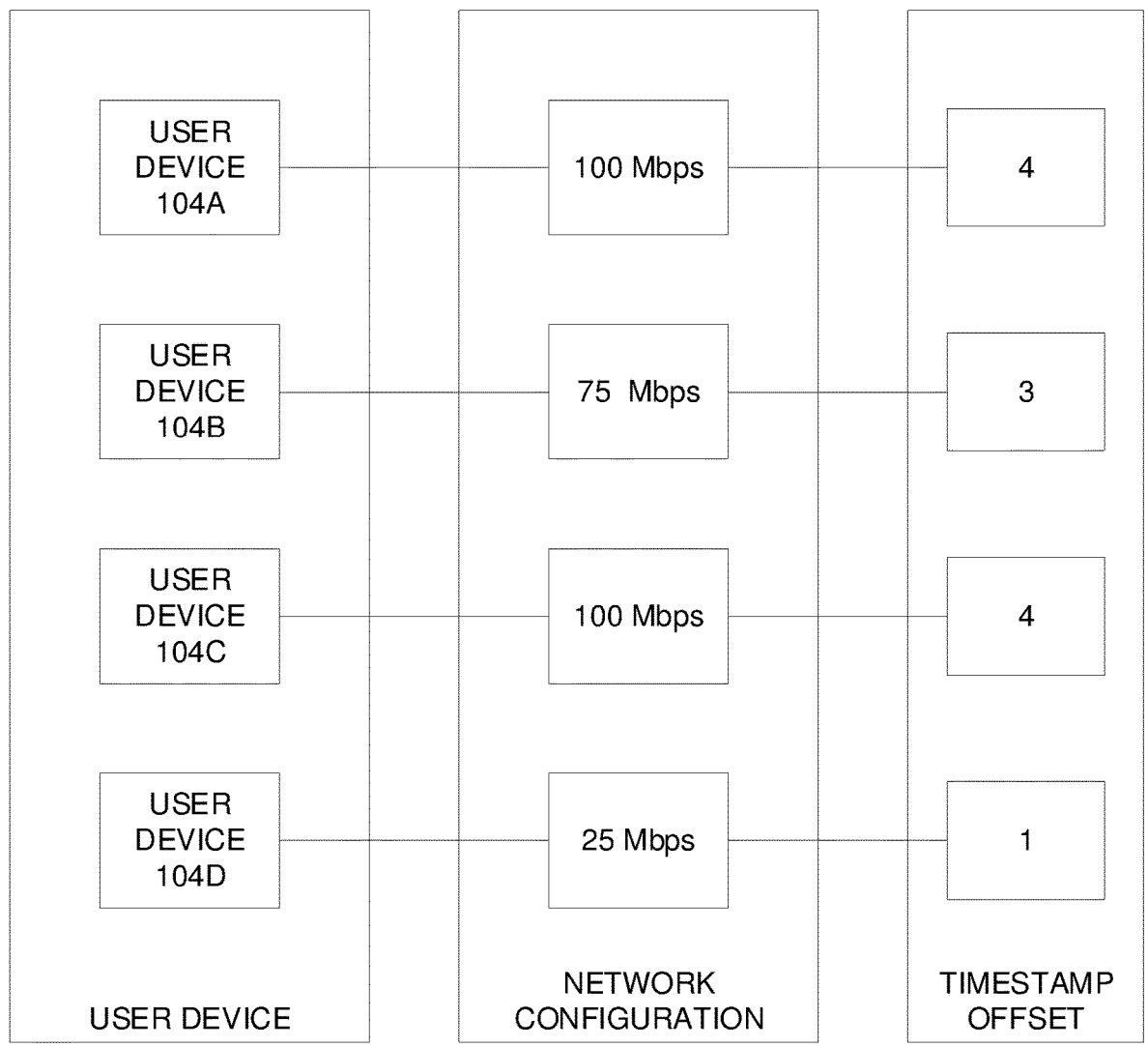
FIG. 3 is a block diagram of a timestamp structure used in accordance with some embodiments.

FIG. 3 is a block diagram of a timestamp structure used in accordance with some embodiments. When content is being transmitted over communal media system 100, at pre-determined time intervals during the session, synchronization system 102b is configured to continuously receive timestamp receipts from each user device 104a-104d. The timestamp receipts include timestamps of when a predefined number of packets is received by a user device. and timestamps of when a predefined number of packets is sent from the device. The interval for delivering and/or receiving timestamp receipts may be static or dynamic Static delivery may involve delivering and/or receiving timestamp receipts at predefined intervals (e.g., every 100 mms) and dynamic delivery may involve adapting delivery and/or receipt of timestamp receipts according to the various speeds of the heterogenous networks of user devices 104a-104d.

Synchronization system 102b may determine a timestamp offset for each user device 104a-104d and for each type/layer of content (video stream, video chat, text and emojis) delivered. In some embodiments, the timestamp offset may be based on a predetermined minimum network configuration and/or the timestamp receipts, wherein synchronization system 102b may adjust packet deliveries to correspond with the timestamp offset of each user device 104a-104d. Continuing with the example where user device 104a has a bandwidth of 100 Mbps, user device 104a has a bandwidth of 75 Mbps, user device 104a has a bandwidth of 100 Mbps, and user device 104a has a bandwidth of 25 Mbps, synchronization system 102b may set the timestamp offset for user devices 104a-104d based on the lowest bandwidth, as shown in FIG. 3. Accordingly, the timestamp offsets for user device 104a and 104c are set to four times the timestamp offset of user device 104d and the timestamp offset for user device 104b is set to three times the timestamp offset of user device 104d, This ensures that when packets are delivered using the timestamp offsets, synchronization system 102b can normalize the delivery of packets to all user devices 104a-104d (i.e., take care of propagation delays or speed up delivery based on the bandwidth). In this manner, all user devices 104a-104d will receive multimedia and social media contents at the same time and without any noticeable delay in receipt of the content among the devices, ensuring that users of devices 104a-104d are viewing and interacting with the content as if they were in the same physical location and viewing the content on the same device.

In addition to sending and receiving timestamp receipts to and from devices 104a-104d, synchronization system 102b may also send and/or receive information associated with frame and/or fragment of the multimedia content to devices 104a-104d. Continuing with the example above, before the viewing session begins, integration system 102c may request, from streaming application 402, a location of a manifest file including multimedia content for a communal viewing session. Streaming application 402 may provide information including, for example, a Uniform Resource Locator (URL) of the manifest file, the name of the manifest file and/or the file itself. Media fragments of, for example, three to six seconds of the multimedia content, may be stored in the manifest file. Based on resolution, each second of the media fragment may include, for example, twenty-four to sixty frames of full motion video and each frame may include a unique frame identifier. Before the communal session, synchronization system 102b may send the URL for the manifest file, via streaming application 402, to user devices 104a-104d participating in the communal session.

In addition to and/or in lieu of timestamp receipts transmitted to and from devices 104a-104d, synchronization system 102b may use the frame identifiers in the media fragments transmitted to and from devices 104a-104d to synchronize delivery of the media to devices 104a-104d. Consider, for example, that during the viewing session synchronization system 102b is to transmit a fragment with twenty-four frames, with each successive frame assigned an identifier from 1-24. Also consider that at time T1, synchronization system 102b is to transmit frames 1-10 to devices 104a-104d, and at time T2, synchronization system 102b is to transmit frames 11-20 to devices 104a-104d. Between T1 and T2 synchronization system 102b may receive frame identifier acknowledgements of the receipts of frames 1-10 from devices 104a-104d. If synchronization system 102b receives a frame identifier acknowledgement of the receipt of frames 1-10 from devices 104a-104b, and a frame identifier acknowledgement of the receipt of frames 1-7 from device 104c, and a frame identifier acknowledgement of the receipt of frames 1-8 from devices 104d, at T2, rather than send frames 8-10 to device 104c and frames 9 and 10 to device 104d, synchronization system 102b may transmit frames 11-20 to devices 104a-104d, thereby synchronizing delivery of the frames to devices 104a-104b with delivery of the frames to devices 104c-104d.

In some embodiments, at the start of the communal session, video player 404 may start to play the media fragments stored in the manifest file for host device 104a in an order determined, for example, by information obtained from the manifest file. At the start of the communal session in host device 104a, the video player may record a timestamp receipt for the start time, for example, in milliseconds or seconds, and may send the timestamp receipt and the frame number of the media fragment being played to synchronization system 102*b*. As the media is played in host device 104*a*, the video player may continuously send timestamp receipts and/or frame identifier acknowledgments of media fragment being played to synchronization system 102*b*. Synchronization system 102*b* may record the frame identifier acknowledgments, timestamp receipts, and/or the timestamp offset of host device 104*a*.

At the start of the communal session, video player 404 may also receive the start time for playing the media in user devices 104*b*-104*d* from synchronization system 102*b*. When the media playback starts, video player 404 may provide, to synchronization system 102*b*, a timestamp receipt of the start time of the media playback on each user device 104*b*-104*d* and the frame identifier acknowledgment of the media fragment(s) received by each user device 104*b*-104*d*. During the communal session, video player 404 may also provide the progress of the media playback on a predetermined basis for each user device 104*b*-104*d* to synchronization system 102*b*. Synchronization system 102*b* may review and compare the locations in the media being played on user devices 104*a*-104*d* on a pre-determined basis. Synchronization system 102*b* may continuously determine that the media being played on user devices 104*a*-104*d* are synchronized within a pre-determined period, for example, a pre-determined number of milliseconds or second. Synchronization system 102*b* may ensure that the media is synchronized on user devices 104*a*-104*d* by exchanging control messages with streaming application 402. Synchronization system 102*b* may dynamically adjust the pre-determined period to ensure the quality of the multimedia content. Synchronization system 102*b* may also ensure that the media being played on user devices 104*b*-104*d* is not ahead of the media being played on host device 104*a*.

Video player 404 may continuously send timestamp receipts and/or the frame identifier acknowledgments for fragment(s) played on each user device 104*a*-104*d* to synchronization system 102*b*. If the media being played on any of user devices 104*a*-104*d* falls behind a certain threshold, synchronization system 102*b* may provide signaling messages to streaming application 402. Synchronization system 102*b* may make necessary adjustments in transmitting the media to user devices 104*a*-104*d*, for example, either by instructing video player 404 to marginally slow the media being played to one or more devices or by accelerate the media being played to one or more devices, until all the devices are on the same frame. By making the necessary adjustments in transmitting the media to user devices 104*a*-104*d*, synchronization system 102*b* may ensure that the media is transmitted and played on all devices within acceptable tolerances.

If host device 104*a* rewinds the media being played on device 104*a*, the time offset associated with host device 104*a* and/or frame number associated with the content is adjusted continuously until host device 104*a* stops rewinding the media and playing the media resumes. Similarly, if host device 104*a* fast forwards the media being played on device 104*a*, the time offset and/or frame number is adjusted continuously until device 104*a* stops fast forwarding the media and playing the media resumes. The rewind or fast forward offset is sent to synchronization system 102*b* for adjustments of the transmissions on the other devices 104*b*-104*d* in the communal session. If host device 104*a* pauses the media being played on device 104*a*, a message is sent to synchronization system 102*b* and transmissions of the media is paused, such that a pause action on device 104*a* pauses playing of the media on all user devices 104*b*-104*d* at the same time.

In addition to performing initial configurations tests, including a speed test, on each user device 104*a*-104*d* to determine that the configuration of user device meets the minimum network threshold at the start of a session, synchronization system 102*b* may perform periodic speed tests (for example, on an as needed basis or at predefined intervals) on each user device 104*a*-104*d*.

Figure 4:
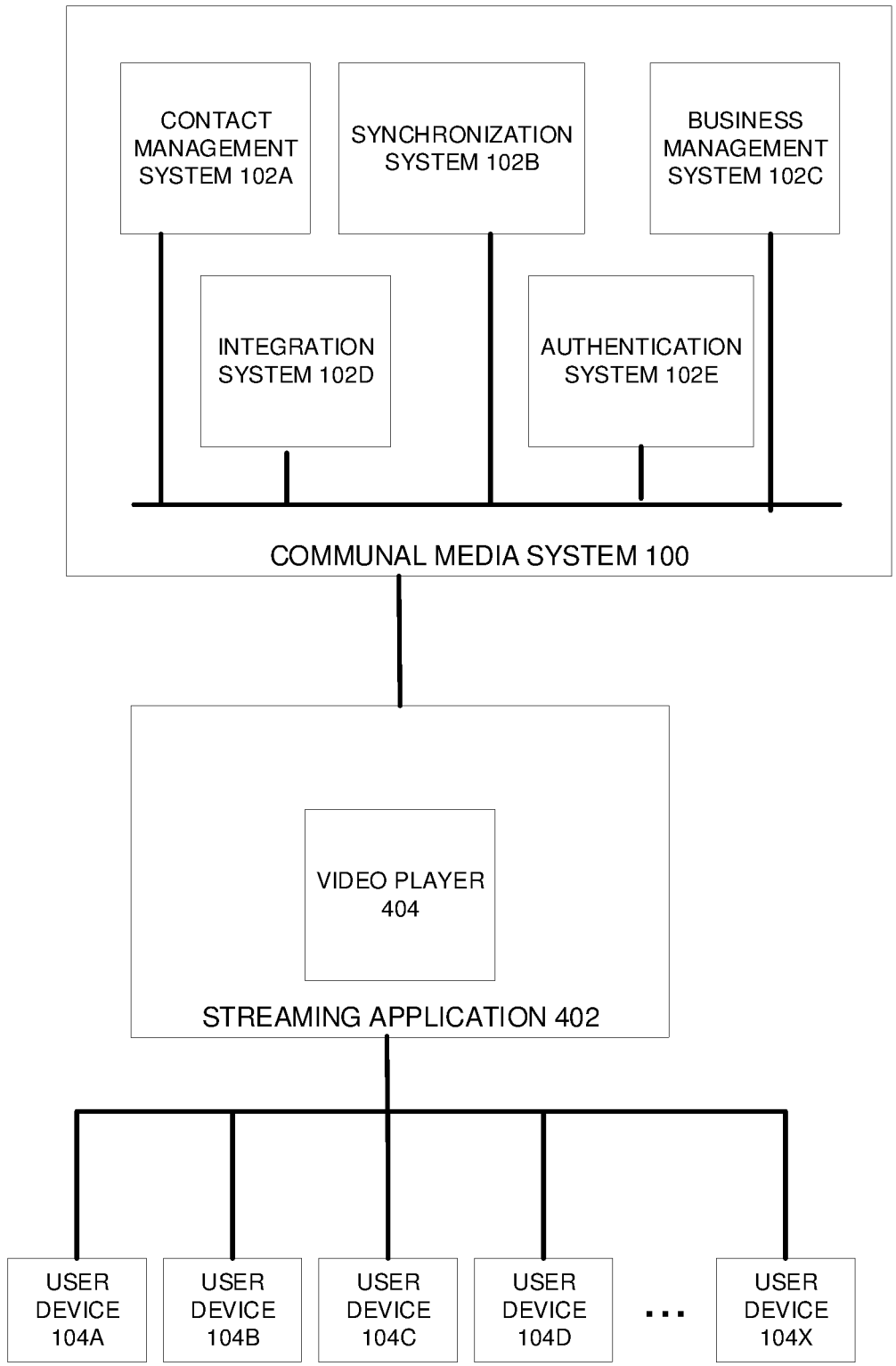
FIG. 4 is a block diagram of an overall system including a streaming application and a communal media system in accordance with some embodiments.

FIG. 4 is an overall block diagram of the communal media system integrated with a streaming application in accordance with some embodiments. Streaming application 402 is configured to communicate with multiple user devices 104 (shown as, for example, user devices 104*a*-104*x*) that are communicatively coupled to each other and with streaming application 402 and communal media system 100. Streaming application 402 may include one or more video players 404, each of which is configured to stream content transmitted from streaming application 402 to a user device 104.

Figure 5:
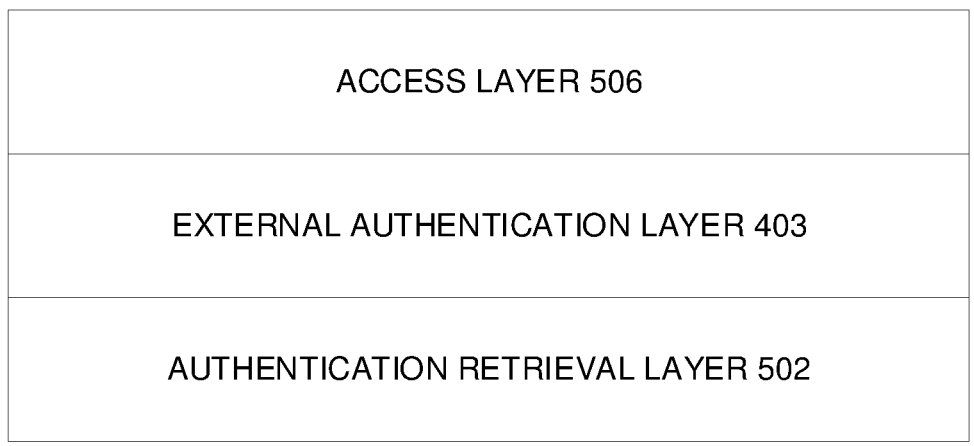
FIG. 5 is a block diagram layers in the overall system in accordance with some embodiments.

FIG. 5 is an overall block diagram of the authentication layers of the overall system in accordance with some embodiments. At authentication retrieval layer 502, authentication system 102*e* is configured to retrieve service provider or content provider information and authentication credentials from user devices 104 that are communicatively coupled to each other and with streaming application 402 and communal media system 100. At external authentication layer 504, when authentication system 102*e* determines access to subscription content is based on subscription with an external service provider, authentication system 102*e* is configured to communicate with an external authentication server or directly with the service provider to authenticate the credentials provided by user devices 104 and to validate entitlements from user devices 104. At access layer 506, authentication system 102*e* is configured to confirm authentication of the credentials provided by user devices 104 based on information received from the external authentication server or the services provider and to allow access to the subscription content to those user devices 104 that have been successfully authenticated and that have been determined to be entitled to access the subscription content.

Figure 6:
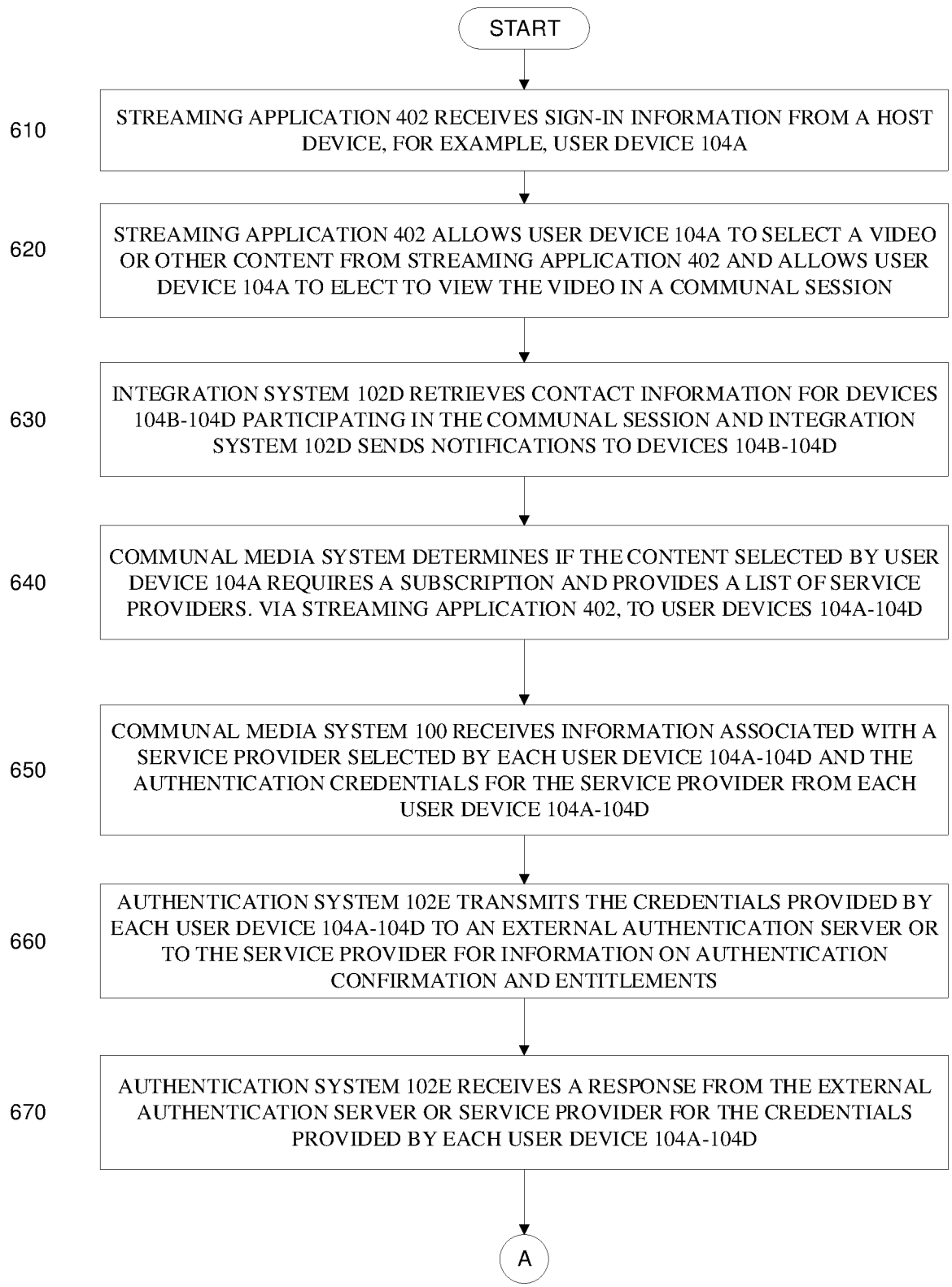
FIG. 6 is a flowchart of a method for authenticating user devices in a communal session via multiple service providers in accordance with some embodiments.

FIG. 6 is a flowchart of a method of authenticating user devices in a communal session via multiple service providers in accordance with some embodiments. At 610, streaming application 402 receives sign in information from a host device, for example, user device 104*a*. At 620, streaming application 402 allows user device 104*a* to select a video or other content from streaming application 402 and allows user device 104*a* to elect to view the video in a communal session. At 630, when the communal session is elected, integration system 102*d* retrieves contact information for devices 104*b*-104*d* participating in the communal session and integration system 102*d* sends notifications to devices 104*b*-104*d*. At 640, communal media system 100 determines if the content selected by user device 104*a* requires a subscription and provides a list of service providers. via streaming application 402, to user devices 104*a*-104*d*. At 650, communal media system 100 receives information associated with a service provider selected by each user device 104*a*-104*d* and the authentication credentials for the service provider from each user device 104*a*-104*d*.

At 660, authentication system 102*e* transmits the credentials provided by each user device 104*a*-104*d* to an external authentication server or to the service provider for information on authentication confirmation and entitlements. The external authentication server authenticates the credential with the service provider. At 670, authentication system 102e receives a response from the external authentication server or service provider for the credentials provided by each user device 104a-104d. At 680, if credentials provided by a user device were not authenticated, authentication system 102e initiates a process whereby the unauthenticated user device may purchase access to the content. At 690, if credentials provided by a user device were authenticated and entitlement to the selected content is confirmed, authentication system 102e allows the authenticated user device to access the content.

Figure 7:
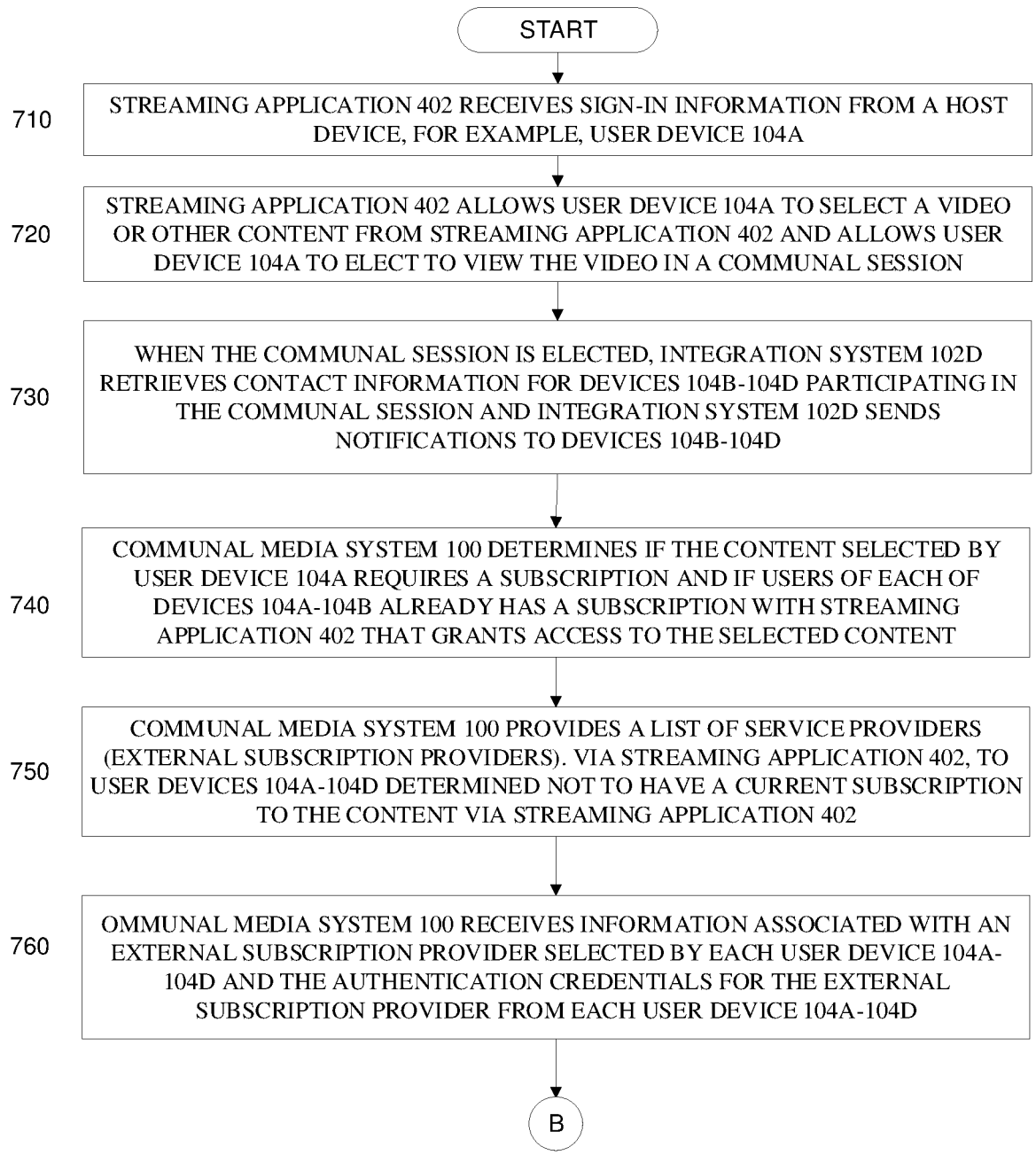
FIG. 7 is another flowchart of a method for authenticating user devices in a communal session via multiple service providers in accordance with some embodiments.
Figure 7:
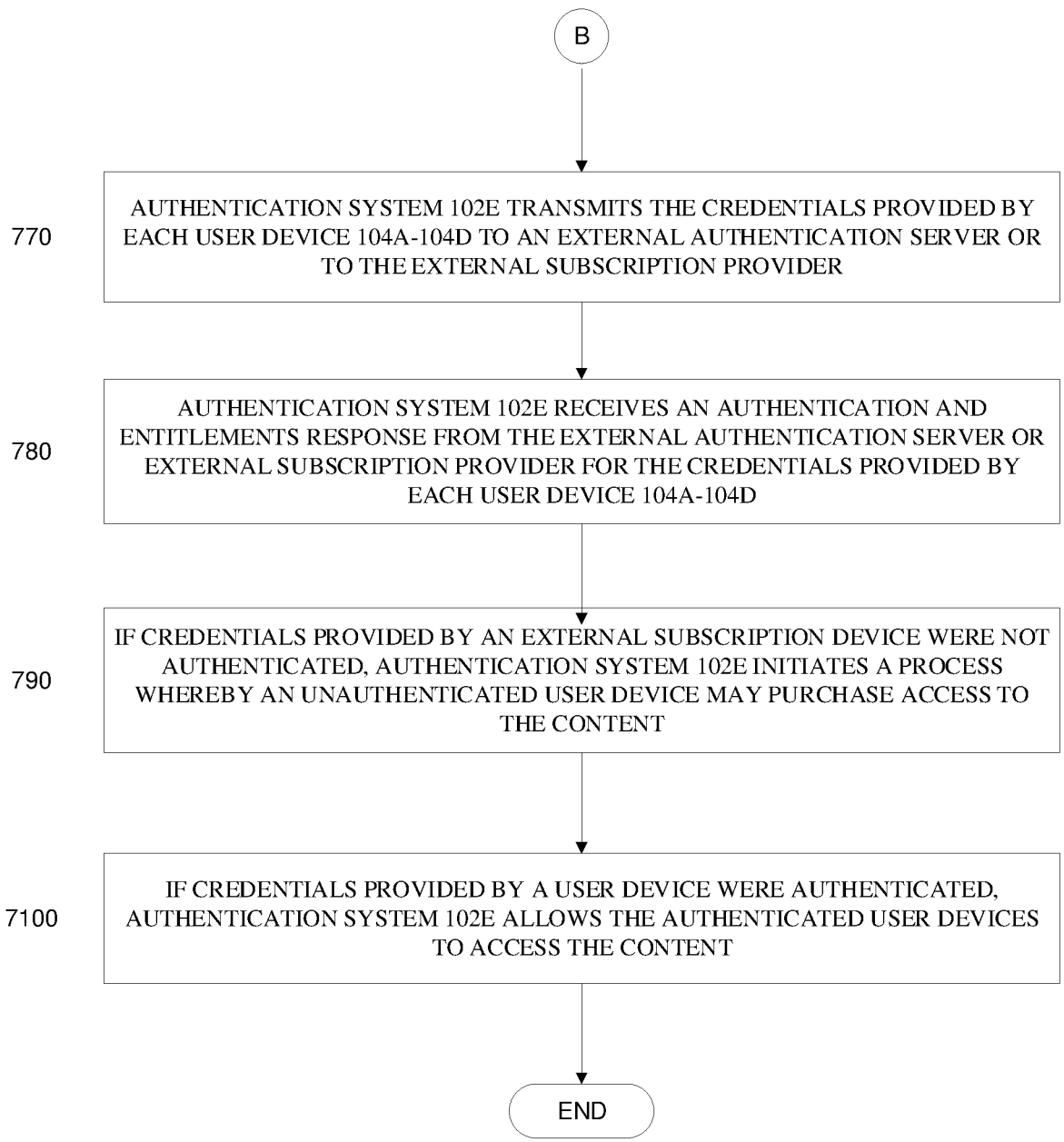

FIG. 7 is a flowchart of another method of authenticating user devices in a communal session via multiple service providers in accordance with some embodiments. At 710, streaming application 402 receives sign in information from a host device, for example, user device 104a. At 720, streaming application 402 allows user device 104a to select a video or other content from streaming application 402 and allows user device 104a to elect to view the video in a communal session. At 730, when the communal session is elected, integration system 102d retrieves contact information for devices 104b-104d participating in the communal session and integration system 102d sends notifications to devices 104b-104d.

At 740, communal media system 100 determines if the content selected by user device 104a requires a subscription and if users of each of devices 104a-104b already has a subscription with streaming application 402 that grants access to the selected content. At 750, communal media system 100 provides a list of service providers (external subscription providers). via streaming application 402, to user devices 104a-104d determined not to have a current subscription to the content via streaming application 402. The external subscription providers may grant user devices 104a-104d access to the selected content. At 760, communal media system 100 receives information associated with an external subscription provider selected by each user device 104a-104d and the authentication credentials for the external subscription provider from each user device 104a-104d.

At 770, authentication system 102e transmits the credentials provided by each user device 104a-104d to an external authentication server or to the external subscription provider. The external authentication server authenticates the credential with the service provider. At 780, authentication system 102e receives an authentication and entitlements response from the external authentication server or external subscription provider for the credentials provided by each user device 104a-104d. At 790, if credentials provided by an external subscription device were not authenticated, authentication system 102e initiates a process whereby an unauthenticated user device may purchase access to the content. At 7100, if credentials provided by a user device were authenticated, authentication system 102e allows the authenticated user devices to access the content.

Figure 8:
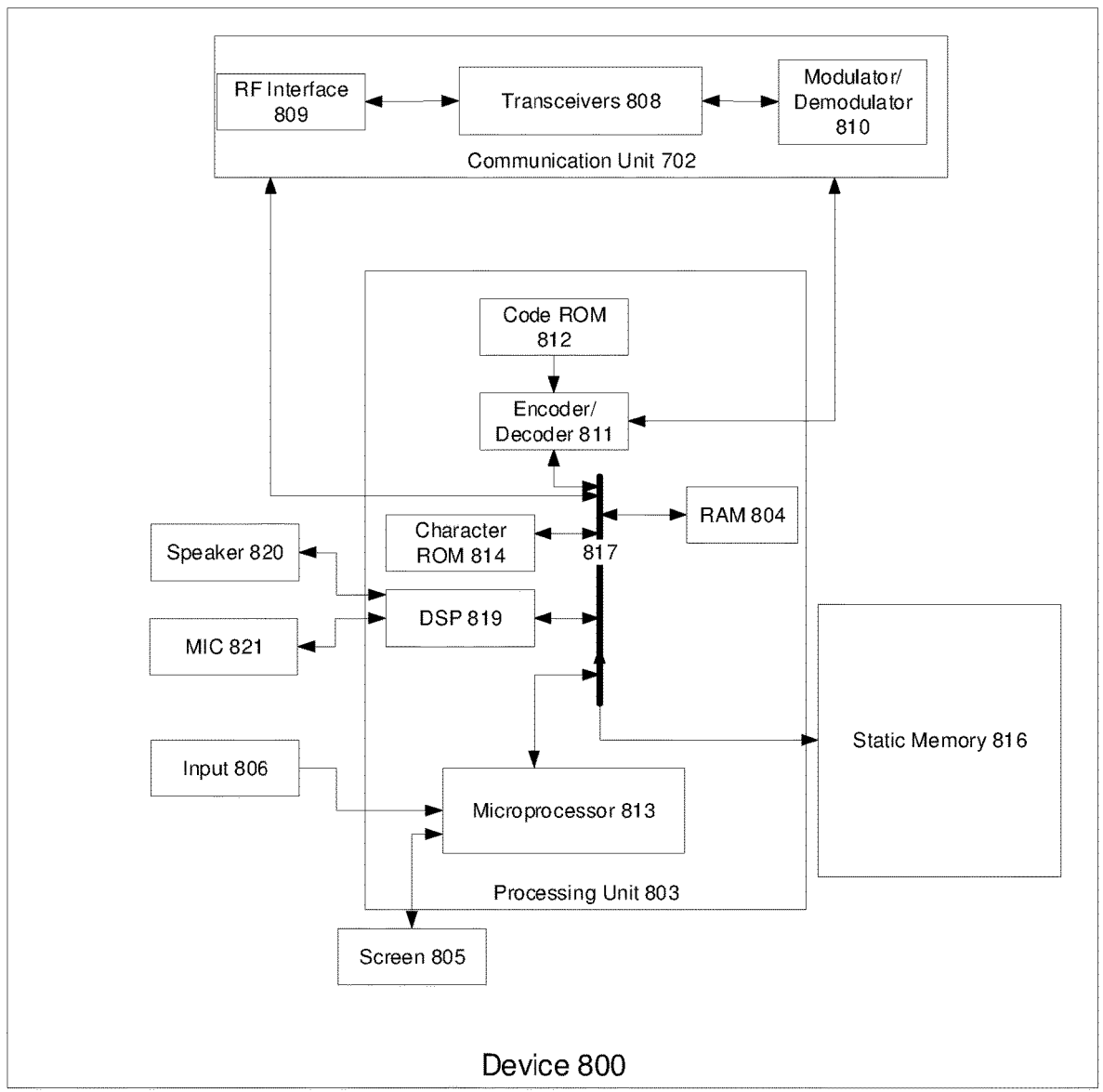
FIG. 8 is a block diagram of a user device used in accordance with some embodiments.

FIG. 8 is a block diagram of a user device 800, such as user device 104 of FIG. 1, used in accordance with some embodiments. User device 800 may include a communications unit 802 coupled to a common data and address bus 817 of a processor 803. Device 800 may also include an input unit (e.g., keypad, pointing device, etc.) 806, an output transducer unit (e.g., speaker) 820, an input transducer unit (e.g., a microphone) (MIC) 821, and a display screen 805, each coupled to be in communication with the processor 803.

The processor 803 may include, that is, implement, an encoder/decoder 811 with an associated code read-only memory (ROM) 812 for storing data for encoding and decoding voice, data, control, or other signals that may be transmitted or received by device 800. The processor 803 may further include one or more of a microprocessor 813 and digital signal processor (DSP) 819 coupled, by the common data and address bus 817, to the encoder/decoder 811 and to one or more memory devices, such as a ROM 814, a random access memory (RAM) 804, and a static or flash memory 816. One or more of ROM 814, RAM 804 and flash memory 816 may be included as part of processor 803 or may be separate from, and coupled to, the processor 803. The encoder/decoder 811 may be implemented by microprocessor 813 or DSP 819, or may be implemented by a separate component of the processor 803 and coupled to other components of the processor 803 via bus 818.

Communications unit 802 may include an RF interface 809 configurable to communicate with network components, and other user equipment within its communication range. Communications unit 802 may include one or more broadband and/or narrowband transceivers 808, such as a Long-Term Evolution (LTE) or 5G transceiver, a WiMAX transceiver perhaps operating in accordance with an IEEE 802.16 standard, and/or other similar type of wireless transceiver configurable to communicate via a wireless network for infrastructure communications. Communications unit 802 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 810 that is coupled to the encoder/decoder 811.

The one or more memory devices 814, 816 may store code for decoding or encoding data such as control, request, or instruction messages, channel change messages, and/or data or voice messages that may be transmitted or received by device 800 and other programs and instructions that, when executed by the processor 803, provide for device 800 to perform the functions and operations described herein.

Figure 9:
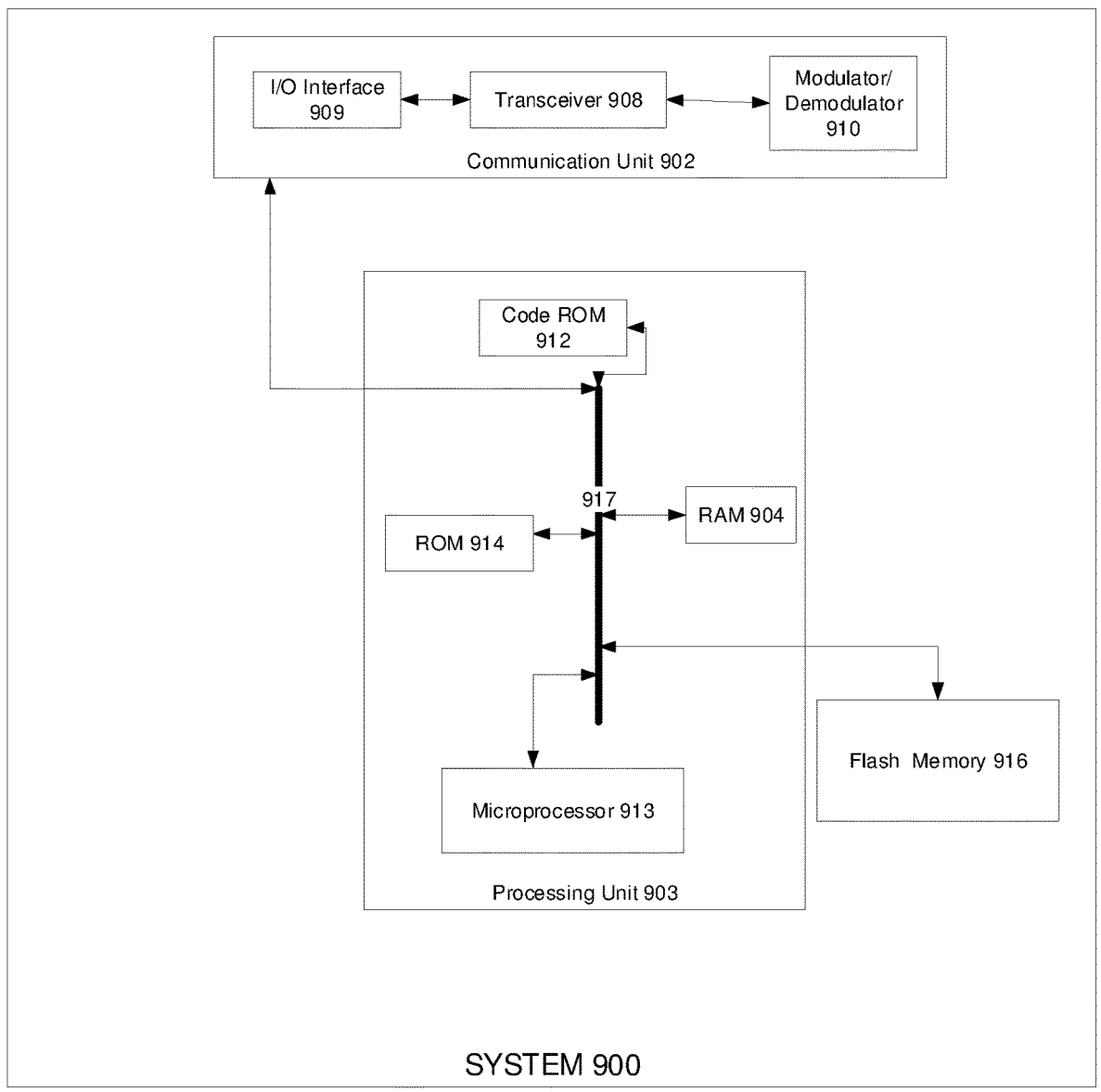
FIG. 9 is a block diagram of a system used in accordance with some embodiments.

FIG. 9 is a block diagram of a system 900, such as system 100 of FIG. 1, used in accordance with some embodiments. System 900, for example, may include a communications unit 902 coupled to a common data and address bus 917 of a processor 903. The processor 903 may include a code read-only memory (ROM) 912 for storing data for initializing system components of system 900. The processor 903 may further include a microprocessor 913 coupled, by the common data and address bus 917, to one or more memory devices, such as a read-only memory (ROM) 914, a random-access memory (RAM) 904, and/or a static or flash memory 916. One or more of ROM 914, RAM 904 and flash memory 916 may be included as part of processor 903 or may be separate from, and coupled to, the processor 903.

Communications unit 902 may include a wired or wireless input/output I/O interface 909 configurable to communicate with network components and other user equipment within its communication range. Communications unit 902 may include one or more broadband and/or narrowband transceivers 908, such as a Long-Term Evolution (LTE) transceiver and/or other similar type of wireless transceiver configurable to communicate via a wireless network for infrastructure communications. Communications unit 902 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 910. The one or more memory devices 912, 914 and 916 are configured to store non-transitory computer-executable instructions to perform a set of functions such as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communal media system, comprising:
an authentication system including a processor to authenticate access to multimedia content on a plurality of user devices participating in a communal session, wherein two or more of the plurality of user devices is entitled to access to the multimedia content through subscriptions on different service platforms;
an integration system including a processor to integrate and communicatively couple the communal media system with a streaming application, wherein an initiator included within the streaming application executes the communal media system within the streaming application, wherein the integration system is configured to receive a source location for the multimedia content selected in the streaming application and share the source location with a player, in the streaming application, that is configured to transmit the multimedia content to each of the plurality of user devices; and
a synchronization system including a processor to initiate video playback on the player for each of the plurality of user devices, synchronize delivery, to each of the plurality of user devices, of the multimedia content and social media content generated on each of the plurality of user devices, and exchange playback control messages with the streaming application to direct synchronized transmissions of the multimedia content and social media content from the player to each of the plurality of user devices,
wherein the multimedia content and the social media content are delivered to each of the plurality of user devices at a same time, without any noticeable lag time during receipt of the multimedia content and the social media content by the plurality of user devices.

2. The communal media system of claim 1, wherein the authentication system is configured to authenticate access to the multimedia content for each of the plurality of user devices based on subscription credentials, provided by each of the plurality of user devices, for the streaming application.

3. The communal media system of claim 1, wherein the integration system is further configured to receive, from each of the plurality of user devices, information about a service provider through which each of the plurality of user devices has a subscription for the multimedia content, wherein the information includes authentication credentials for accessing the selected content through the service provider.

4. The communal media system of claim 3, wherein the authentication system is configured to transmit the authentication credentials from each of the plurality of user devices to one of an external authentication server or the service provider and to obtain confirmation of authentication and entitlement validation from one of the external authentication server or the service provider for each of the plurality of user devices.

5. The communal media system of claim 1, wherein the authentication system is configured to provide a subscription for the multimedia content to each of the plurality of user devices that is not authenticated to access the multimedia content.

6. The communal media system of claim 1, wherein the authentication system is configured to provide access to the multimedia content to each of the plurality of user devices that is authenticated to access the multimedia content.

7. The communal media system of claim 1, wherein the authentication system is configured to authenticate subscription for the multimedia content for each of the plurality of user devices at an initial time when a communal session is initiated.

8. The communal media system of claim 1, wherein the authentication system is configured to authenticate subscription for the multimedia content for each of the plurality of user devices at an appointed time when a communal session is activated.

9. The communal media system of claim 1, wherein the source location information is based on subscription content accessed by a host device.

10. The communal media system of claim 1, wherein the source location information is based on subscription content accessed by one of the plurality of user devices selected by a host device.

11. A method, comprising:
authenticating, by a processor in a communal media system, access to multimedia content on a plurality of user devices participating in a communal session, wherein two or more of the plurality of user devices is entitled to access to the multimedia content through subscriptions on different service platforms;
integrating and communicatively coupling, by the processor, the communal media system with a streaming application, wherein an initiator included within the streaming application executes the communal media system within the streaming application and wherein the integrating includes receiving a source location for the multimedia content selected in the streaming application and sharing the source location with a player, in the streaming application, that is configured to transmit the multimedia content to each of the plurality of user devices; and
initiating, by the processor, video playback on the player for each of the plurality of user devices, synchronizing delivery, to each of the plurality of user devices, of the multimedia content and social media content generated on each of the plurality of user devices, and exchanging playback control messages with the streaming application to direct synchronized transmissions of the multimedia content and social media content from the player to each of the plurality of user devices,
wherein the multimedia content and the social media content are delivered to each of the plurality of user devices at a same time, without any noticeable lag time during receipt of the multimedia content and the social media content by the plurality of user devices.

12. The method of claim 11, further comprising authenticating access to the multimedia content for each of the plurality of user devices based on subscription credentials, provided by each of the plurality of user devices, for the streaming application.

13. The method of claim 11, wherein the integrating further comprises receiving, from each of the plurality of user devices, information about a service provider through which each of the plurality of user devices has a subscription for the multimedia content, wherein the information includes authentication credentials for accessing the selected content through the service provider.

14. The method of claim 13, wherein the authenticating further comprises transmitting the authentication credentials from each of the plurality of user devices to one of an external authentication server or the service provider and obtaining confirmation of authentication and entitlement validation from one of the external authentication server or the service provider for each of the plurality of user devices.

15. The method of claim 13, further comprising providing a subscription for the multimedia content to each of the plurality of user devices that is not authenticated to access the multimedia content.

16. The method of claim 13, further comprising providing access to the multimedia content to each of the plurality of user devices that is authenticated to access the multimedia content.

17. The method of claim 13, further comprising authenticating subscription for the multimedia content for each of the plurality of user devices at an initial time when a communal session is initiated.

18. The method of claim 13, further comprising authenticating subscription for the multimedia content for each of the plurality of user devices at an appointed time when a communal session is activated.

* * * * *